United States Patent [19]

Hino et al.

[11] Patent Number: 5,324,556
[45] Date of Patent: Jun. 28, 1994

[54] POLYESTER BLOW-MOLDED ARTICLES

[75] Inventors: Toshiaki Hino; Katsutoshi Muramatsu, both of Kawasaki; Eiichiro Takiyama, Kamakura, all of Japan

[73] Assignee: Showa Highpolymer Co., Ltd., Tokyo, Japan

[21] Appl. No.: 49,435

[22] Filed: Apr. 20, 1993

[30] Foreign Application Priority Data

May 8, 1992 [JP] Japan ................... 4-116240

[51] Int. Cl.$^5$ ............................................ B29D 22/00
[52] U.S. Cl. .................... 428/35.7; 528/272; 528/296; 528/302; 525/437; 525/440
[58] Field of Search ............ 528/272, 296, 302; 529/437, 440; 428/35.7

[56] References Cited

U.S. PATENT DOCUMENTS

| | | | |
|---|---|---|---|
| 2,999,851 | 9/1961 | Elmer | 528/83 |
| 2,999,851 | 9/1961 | Elmer | 528/83 |
| 4,041,208 | 8/1977 | Seeger et al. | 428/424 |
| 4,166,873 | 9/1979 | Gilliam | 428/34.7 |
| 4,442,282 | 4/1984 | Kolycheck | 528/83 |
| 5,068,143 | 11/1991 | Agger et al. | 428/241 |

FOREIGN PATENT DOCUMENTS

| | | |
|---|---|---|
| 0044969 | 2/1982 | European Pat. Off. |
| 0323700 | 7/1989 | European Pat. Off. |
| 0363920 | 4/1990 | European Pat. Off. |
| 0393819 | 10/1990 | European Pat. Off. |
| 1059075 | 3/1954 | France . |
| 2303037 | 10/1976 | France . |
| 2345479 | 10/1977 | France . |
| 748872 | 5/1956 | United Kingdom . |

OTHER PUBLICATIONS

Database WPI, Week 9122, Derwent Publications Ltd., London, GB; AN 91-161099 for JP-A-3-97723 (Sekisui Chem. Ind.), Apr. 23, 1991.

*Primary Examiner*—Samuel A. Acquah
*Attorney, Agent, or Firm*—Sughrue, Mion, Zinn, Macpeak & Seas

[57] ABSTRACT

Blow-molded articles consisting of an aliphatic polyester having a melt viscosity of $3.0 \times 10^3$–$2.0 \times 10^5$ poises at a temperature of 190° C. at a shear rate of 100 sec$^{-1}$ and a melting point of 70°–190° C. The present invention provides blow-molded articles excellent in heat stability and mechanical strength as well as having biodegradability which can be used for containers of detergents, cosmetics and the like, and industrial parts.

11 Claims, No Drawings

POLYESTER BLOW-MOLDED ARTICLES

BACKGROUND OF THE INVENTION

1. Field of the Invention

The present invention relates to blow-molded articles having excellent heat stability and mechanical strength which are prepared by using aliphatic polyesters with biodegradability and sufficiently high molecular weights and specific melt properties for practical use.

2. Discussion of the Background

Recently, with the advancement of plastic blow molded containers for both industrial and domestic uses because of their productivity, variety, fashionability, chemical resistance and rust prevention, the resulting waste of a large amount of plastics used in the vessels can pollute rivers, oceans, soil and the like and has become serious community problem. To prevent such pollution the development of biodegradable plastics has been desired; for example, poly(3-hydroxybutylate) produced by fermentation methods using microorganisms, blends of general-purpose plastics and starch, a naturally occurring polymer, and the like are already known. The former polymer has a drawback in that it is poor in molding properties because the polymer has a heat decomposition temperature close to its melting point and a raw material efficiency is very bad because it is produced by microorganisms. On the other hand, since the naturally occurring polymer of the latter does not by itself have thermoplasticity, the polymer has defects in molding properties, and is greatly limited in its range of application.

On the other hand, although it is known that aliphatic polyesters are biodegradable, they have hardly been used because polymeric material sufficient enough to obtain practical molded product cannot be obtained. Recently, it has been found that a ring-opening polymerization of ε-caprolactone produces a higher molecular weight polymer, and proposed to use the polymer as a biodegradable resin. However, the resulting polymer is limited to only special applications because of a low melting point of 62° C. and a high cost thereof. Further, although glycolic acid, lactic acid and the like are polymerized by a ring-opening polymerization of glycolide and lactide thereof to obtain polymers with higher molecular weights so as to be sometimes used as medical fibers and the like, the polymers are not used in great amounts as raw materials for blow-molded articles because their decomposition temperatures are close to their melting point and they have defects in their molding properties.

Although most of these are applied to plastic blow-molded vessels, it is no exaggeration to say that high molecular weight polyesters (referring to polyesters having number-average molecular weights of at least 10,000) generally used for the plastics are limited to polyethylene terephthalate, a condensate of terephthalic acid (including dimethyl terephthalate) and ethylene glycol. Although there are cases of 2,6-naphthalenedicarboxylic acid being used instead of terephthalic acid, there are no reports of trials which obtained polymers with biodegradability.

Therefore, it is safe to say that there has been no concept of trying to make the articles in practical use by blow molding using biodegradable aliphatic polyesters in which aliphatic dicarboxylic acid was used.

One of the reasons why this application concept has not been thought of is felt to be that in spite of the required special molding conditions and physical properties for the above blow-molded articles, most of the above-mentioned aliphatic polyesters have melting points of 100° C. or lower even if they are crystalline, and have poor heat stability when melted above that. Of further importance is that the properties, particularly mechanical properties such as tensile strength, of these aliphatic polyesters show markedly poor values even when they are the same level of number-average molecular weight as the above-mentioned polyethylene terephthalate, so just conceiving that the molded articles having required strength and the like would be obtained was difficult.

Another reason seems to be that studies for improving the physical properties of the aliphatic polyesters by increasing their number-average molecular weights have not been sufficiently advanced because of their poor heat stability.

The object of the present invention is to provide blow-molded articles prepared by using the above-mentioned aliphatic polyesters as their components which have sufficient high molecular weights for practical use, and excellent mechanical properties represented by heat stability and tensile strength, and which can be decomposed by microorganisms and the like, i.e., are biodegradable as one means of waste disposal so that they may be easily disposed of after the use thereof.

SUMMARY OF THE INVENTION

As a result of various studies of the reaction conditions for obtaining polyesters having sufficient high molecular weight for practical use and molding properties suitable for blow-molded articles, the present inventors have obtained specific aliphatic polyesters that maintain biodegradability while having sufficient high molecular weights for practical use, then have found that blow-molded articles prepared from the polyesters have heat stability and mechanical strength as well as the above-mentioned biodegradability to achieve the present invention.

That is, the present invention provides: (A) blow-molded articles mainly consisting of an aliphatic polyester having a melt viscosity of $3.0 \times 10^3 - 2.0 \times 10^4$ poises at a temperature of 190° C. and a shear rate of 100 $\sec^{-1}$, and having a melting point of 70°-190° C.; (B) blow-molded articles according to (A) in which the number-average molecular weight of the aliphatic polyester is at least 10,000 and includes 0.03-3% by weight of urethane bonds; (C) blow-molded articles according to (A) or (B) consisting of an aliphatic polyester obtained by reacting 0.01-5 parts by weight of diisocyanate with 100 parts by weight of an aliphatic polyester prepolymer having a number-average molecular weight of at least 5,000 and a melting point of at least 60° C.; and (D) blow-molded articles according to (A) to (C) in which tensile strength at break is 320 kg/cm$^2$ or more, elongation at break is 300% or more, stiffness is 3,000 kg/cm$^2$ or more, and notched Izod impact strength determined with a pressed test piece at 23 ° C. is 1.0 kg·cm/cm$^2$ or more.

DETAILED DESCRIPTION OF THE INVENTION

The present invention will be described below in further detail.

The aliphatic polyester of the present invention mainly consists of a polyester obtained by reacting two components of glycols and dicarboxylic acid (or acid anhydrides thereof), and if necessary as a third component, with at least one polyfunctional component selected from the group consisting of trifunctional or tetrafunctional polyols, oxycarboxylic acids, and polybasic carboxylic acids (or acid anhydrides thereof). The aliphatic polyesters are prepared by reacting relatively high molecular weight polyester prepolymers which have hydroxyl groups at ends with a coupling agent so as to make them even higher molecular weight polymer.

It has been known to obtain polyurethane by reacting a low molecular weight polyester prepolymer having a number-average molecular weight of 2,000–2,500, which have hydroxyl groups as the terminal groups, with diisocyanate as a coupling agent in the preparation of rubbers, foams, coatings and adhesives.

However, the polyester prepolymers used in these polyurethane foams, coatings and adhesives are prepolymers having a low molecular weight and a number-average molecular weight of 2,000–2,500 which is the maximum that can be prepared by non-catalytic reaction. To obtain practical physical properties as the polyurethane, it is necessary that the content of diisocyanate should be as much as 10–20 parts by weight in relation to 100 parts by weight of this low molecular weight prepolymer. When such a large amount of diisocyanate is added to the low molecular weight polyester melted at 150° C. or higher, gelation occurs so that no normal resins which can be molded in the melt state can be obtained.

Therefore, polyesters which are obtained by using a large amount of diisocyanate in the reaction with a low molecular weight polyester prepolymers as a raw material cannot be used as the plastic raw material for the blow-molded articles of the present invention.

Also, as shown in the case of polyurethane rubbers, although a method is coceivable in which hydroxyl groups are converted into isocyanate groups by the addition of diisocyanate, and then the number-average molecular weight thereof is further increased by using glycols, the same problem as mentioned above arises because 10 parts by weight of diisocyanate relative to 100 parts by weight of the prepolymer should be used in order to obtain practical physical properties.

When a relatively high molecular weight polyester prepolymer is to be used, heavy metal catalysts required to prepare the prepolymer would promote the reactivity of the above-mentioned isocyanate groups to undesirably cause poor preservativity, generation of crosslinking and branching; hence a number-average molecular weight of not more than around 2,500 of polyester prepolymers would be the limit if they were to be prepared without catalysts.

The polyester prepolymers to obtain the aliphatic polyesters used in the present invention are relatively high molecular weight saturated aliphatic polyesters having substantially hydroxyl groups at the ends thereof, number-average molecular weights of at least 5,000, preferably at least 10,000, and melting point of 60° C. or higher, which are obtained by reacting glycols and dibasic carboxylic acids (or acid anhydrides thereof) in the presence of catalysts. When a prepolymer having a number-average molecular weight of lower than 5,000 is used, the small amounts of 0.1–5 parts by weight of coupling agents used in the present invention cannot provide poyesters for blow-molding having good physical properties. When polyester prepolymers having number-average molecular weights of 5,000 or higher are used, with hydroxyl values of 30 or less, the use of small amounts of coupling agents even under severe conditions such as a molten state and the like can produce high molecular weight polyesters without gelation as the reaction is not affected by remaining catalyst.

Therefore, the polymer for the blow-molded articles of the present invention has a repeated chain structure in which a polyester prepolymer having a number-average molecular weight of 5,000 or more, preferably 10,000 or more and consisting of an aliphatic glycol and aliphatic dicarboxylic acid is combined through the urethane bonds derived from, for example, diisocyanate as a coupling agent.

Further, the polymer for the blow-molded articles of the present invention has a repeated chain structure in which the above-mentioned polyester prepolymer provided with branched long chains derived from polyfunctional components is combined through the urethane bonds derived from, for example, diisocyanate as a coupling agent. When oxazoline, epoxy compounds, and acid anhydrides are used as a coupling agent, the polyester prepolymer has a repeated chain structure through ester bonds.

The blow molded-articles of the present invention consisting of an aliphatic polyester having a melt viscosity of $3.0 \times 10^3$–$2.0 \times 10^5$ poises at a temperature of 190° C. at a shear rate of 100 sec$^{-1}$ and a melting point of 70°–190° C., particularly the blow-molded articles of the present invention which consists of an aliphatic polyester obtained by reacting 0.1–5 parts by weight of diisocyanate with 100 parts by weight of an aliphatic polyester prepolymer having a number-average molecular weight of 5,000 or higher and a melting point of 60° C. or higher has biodegradability when buried in the earth; generates lower heat of combustion than polyethylene and polypropyrene even when disposed into an incinerator; and has excellent in heat stability and mechanical strength. Therefore, it can be used for containers of detergents, cosmetics and the like, and industrial products.

Examples of glycols which can be used as a reaction component include aliphatic glycols. Among them those having a straight chain alkylene group with even number carbon atoms of 2, 4, 6, 8 and 10 such as: ethylene glycol, 1,4-butanediol, 1,6-hexanediol, 1,8-octanediol, 1,10-decanediol, and mixtures thereof are preferable.

Of these glycols, those having a smaller number of carbon atoms, such as ethylene glycol, 1,4-butanediol and 1,6-hexanediol, are preferable because they can produce an aliphatic polyester having a high crystalinity and a high melting point. In particular, ethylene glycol and 1,4-butanediol are most suitable because they produce good results.

Examples of aliphatic dicarboxylic acids or anhydrides thereof which provide aliphatic polyester by reacting with glycols include aliphatic dicarboxylic acids. Among them those having a straight chain alkylene group with even number carbon atoms of 2, 4, 6, 8 and 10 such as: succinic acid, adipic acid, suberic acid, sebacic acid, 1,10-decanedicarboxylic acid, succinic anhydride and mixtures thereof are preferable. Of these dicarboxylic acids, those having a smaller number of carbon atoms, such as succinic acid, adipic acid and succinic anhydride, are preferable because they can produce an aliphatic polyester having high crystalinity and high melting points. In particular, succinic acid, succinic anhydride and an acid mixture of succinic acid or succinic anhydride and another dicarboxylic acid such as adipic acid, suberic acid, sebacic acid or 1,10-decanedicarboxylic acid are preferable.

In the system of an acid mixture containing two or more acid components, for example, succinic acid and other dicarboxylic acids, the mixing ratio of succinic acid is at least 70 mol%, preferably at least 90 mol%, and the mixing ratio of the other carboxylic acids is 30 mol% or less, preferably 10 mol% or less.

A combination of 1,4-butanediol and succinic acid or succinic anhydride and a combination of ethylene glycol and succinic acid or succinic anhydride are particularly preferable for the present invention because the combinations exhibit melting points close to that of polyethylene. (Third component)

To these glycols and dicarboxylic acid, if necessary, may be added as a third component at least one polyfunctional component selected from the group consisting of trifunctional or tetrafunctional polyols, oxycarboxylic acid, and polybasic carboxylic acids (or acid anhydrides thereof). The addition of this third component, which causes the branching of long chains, can impart desirable properties in molten state to the polyester prepolymer, because the ratio of weight-average molecular weight (MW)/number-average molecular weight (Mn), i.e., the molecular weight distribution, increases with increases in its molecular weight.

In terms of the amount of polyfunctional components to be added without fear of gelation, a trifunctional component of 0.1-5 mole %, or a tetrafunctional component of 0.1-3 mole % is added relative to 100 mole % of the total of aliphatic dicarboxylic acid (or acid anhydride thereof) components.

Polyfunctional components

Examples of polyfunctional components as the third component include trifunctional or tetrafunctional polyols, oxycarboxylic acids, and polybasic-carboxylic acids.

The trifunctional polyols representatively include trimethylol propane, glycerin or anhydrides thereof. The tetrafunctional polyols representatively include pentaerythritol.

The trifunctional oxycarboxylic acid components are divided into the two types of (i) a component which has two carboxyl groups and one hydroxyl group in one molecule, and (ii) another component which has one carboxyl group and two hydroxyl groups in one molecule. Malic acid which has two carboxyl groups and one hydroxyl group in one molecule becomes practical and sufficient to the purposes of the present invention in view of commercial availability at low cost.

The tetrafunctional oxycarboxylic acid components are the following three types of components:

(i) A component which has three carboxyl groups and one hydroxyl group in one molecule;

(ii) Another component which has two carboxyl groups and two hydroxyl groups in one molecule; and (iii) The remaining component which has three hydroxyl groups and one carboxyl group in one molecule. Any type can be used, though in view of commercial availability at low cost, citric acid and tartaric acid are practical and sufficient to the purposes of the present invention.

As a trifunctional polybasic carboxylic acid (or acid anhydride thereof) component trimesic acid, propane tricarboxylic acid and the like can be used. Among them, trimesic anhydride is practical for the purposes of the present invention.

As a tetrafunctional polybasic carboxylic acid (or anhydride thereof) various types of aliphatic compounds, cycloaliphatic compounds, aromatic compounds and the like, described in certain literatures, can be used. In view of commercial availability, for example, pyromellitic anhydride, benzophenone tetracarboxylic anhydride and cyclopentane tetracarboxylic anhydride are practical and sufficient to the purposes of the present invention.

These glycols and dibasic acids are mainly consisted of aliphatic series, while small amounts of other components, for example, aromatic series may be concomitantly used. These other components may be blended or copolymerized in amounts up to 20% by weight, preferably up to 10% by weight, and more preferably up to 5% by weight because using these compounds degrades biodegradability.

The polyester prepolymer for aliphatic polyesters to be used in the present invention has hydroxyl groups at the terminals. To introduce the hydroxyl groups, it is necessary that glycols are used somewhat excessively.

For preparation of the polyester prepolymer having a relatively high molecular weight, it is necessary to use deglycol-reaction catalysts in the deglycol reaction subsequent to the esterification. Examples of the deglycol-reaction catalysts include titanium compounds such as acetoacetoyl type titanium chelate compounds and organic alkoxy titanium compounds and the like. These titanium compounds can be used in combination. Examples of compounds used in combination include diacetoacetoxy oxytitanium (Nippon Chemical Industry Co., Ltd.; Nursem Titanium) tetraethoxy titanium, tetrapropoxy titanium, tetrabutoxy titanium and the like. The amount of the titanium compound used is 0.001-1 part by weight, and preferably 0.01-0.1 part by weight relative to 100 parts by weight of the polyester prepolymer. These titanium compounds may be blended before the esterification, or may be blended immediately before the deglycol-reaction.

To the polyester prepolymer which has a number-average molecular weight of at least 5000, preferably at least 10,000, and whose terminal groups are substantially hydroxyl groups are added coupling agents in order to increase its number-average molecular weight.

Examples of the coupling agents include diisocyanate, oxazoline, diepoxy compounds, acid anhydrides and the like. Diisocyanate is particularly preferred.

In the cases of oxazoline and diepoxy compounds, it is necessary that the terminal hydroxyl groups are reacted with acid anhydrides and the like to convert them into carboxyl groups, then coupling agents are used.

Although not limited, examples of diisocyanate include 2,4-tolylene diisocyanate, a mixture of 2,4-tolylene diisocyanate and 2,6-tolylene diisocyanate, diphenylmethane diisocyanate, 1,5-naphthylene diisocyanate, xylylene diisocyanate, hydrogenated xylylene diisocyanate, hexamethylene diisocyanate, isophorone diisocyanate and the like. Particularly, hexamethylene diisocyanate is preferably used in terms of hue of prepared resins, reactivity at the time of blending polyesters, and the like.

The adding amounts of these coupling agents are 0.1-5 parts by weight, and preferably 0.5-3 parts by weight relative to 100 parts by weight of polyester prepolymer. Addition of less than 0.1 part by weight causes insufficient coupling reaction, whereas with more than 5 parts by weight gelation tends to occur.

The addition is preferably performed when the polyester is in a uniformly molten state under easily stirrable conditions. Although it is not impossible for the coupling agents to be added to the polyester prepolymer in the solid state and melted and mixed through an extruder, adding the agents in a polyester preparation unit, or adding them to polyester prepolymer in a molten state (for example, in a kneader) is more practical.

The aliphatic polyester to be used in the present invention is required to have selected melt properties for blow molding. That is, the aliphatic polyester needs to have melt viscosity of $3.0 \times 10^3$–$2.0 \times 10^5$ poises, preferably $1.2 \times 10^4$–$3.0 \times 10^4$ poises, and more preferably $1.6 \times 10^4$–$2.6 \times 10^4$ poises at a temperature of 190° C. at a shear rate of 100 sec$^{-1}$.

A melt viscosity of more than $2.0 \times 10^5$ poises does not result in parisons with good appearance, whereas a melt viscosity of less than $3.0 \times 10^3$ poises does not result in molded articles with enough and uniform thickness because of poor drawdown properties.

The melting point of the aliphatic polyester to be used in the present invention needs to be 70°–190° C. preferably 70°–150° C., and more preferably 80°–135° C. A melting point lower than 70° C. will give blow-molded articles poor heat resistance to distort them, whereas with higher than 190° C. it is difficult to carry out blow molding.

To achieve a melting point higher than 70° C. the polyester prepolymer need to have a melt temperature of at least 60° C.

When urethane bonds are contained in the aliphatic polyester to be used in the present invention, the amount of urethane bonds is 0.03–3.0% by weight, preferably 0.05–2.0% by weight, and more preferably 0.1–1.0% by weight.

The amount of urethane bonds is measured by $^{13}$C NMR, showing good correlation with the charged amount.

Less than 0.03% by weight of urethane bonds has a little effect on polymerization and leads to poor molding properties, whereas more than 3% by weight causes gelation.

It is needless to say that when the above-mentioned aliphatic polyester is used to obtain the blow-molded articles according to the present invention, if necessary, lubricants, waxes, coloring agents, crystallizing promoters and reinforcing fibers as well as antioxidants, thermal stabilizers, UV absorbers and the like can be used concomitantly.

That is, antioxidants include hindered phenol antioxidants such as p-tert-butyl hydroxytoluene and p-tertbutyl hydroxyanisole, sulfur antioxidants such as distearyl thiodipropionate and dilauryl thiodipropionate, and the like; heat stabilizers include triphenyl phosphite, trilauryl phosphite, trisnonylphenyl phosphite and the like; UV absorbers include p-tert-butyl phenyl salicylate, 2-hydroxy-4-methoxybenzophenone, 2-hydroxy-4-methoxy-2'-carboxybenzophenone, 2,4,5-trihydroxybutylophenone and the like; lubricants include calcium stearate, zinc stearate, barium stearate, sodium palmirate and the like; antistatic agents include N,N-bis(hydroxyethyl)alkyl amine, alkyl amine, alkyl allyl sulfonate, alkyl sulfonate and the like; flame retarders include hexabromocyclododecane, tris-(2,3-dichloropropyl) phosphate, pentabromophenyl allyl ether and the like; inorganic fillers include calcium carbonate, silica, titanium oxide, talc, mica, barium sulfate, alumina and the like; crystallizing promoters include polyethylene terephthalate, poly-trans-cyclohexane dimethanol terephthalate and the like; reinforcing fibers include inorganic fibers such as glass fiber, carbon fiber, boron fiber, silicon carbide fiber, graphite fiber, alumina fiber and amorphous fiber, and organic fibers such as aramide fiber, and the like.

The raw material mainly comprising aliphatic polyester to be used for the blow-molded articles of the present invention may processed by direct blow molding, accumulator type blow molding, injection blow molding, stretch blow molding or multi-layer blow molding.

When processed by the direct blow molding method, the temperature of the parison to be plasticized is 70°–220° C., preferably 160°–200° C., and more preferably 170°–190° C. This is because the resin is not melted and plasticized completely around its melting point, and the surface of the parisons is disadvantageously roughen. Further, at a temperature above 220° C. drawdown properties become poor. The term drawdown property represents the ratio of the times which take for a parison to reach a length of 60 cm and 12 cm respectively when the resin is extruded at a shear rate of 100 sec$^{-1}$ at the tip of a die or core.

EXAMPLES

The present invention will be illustrated with reference to the following Examples and Comparative Examples, but the invention is not intended to be limited only thereto. In the following Examples, the tensile strength was measured according to JIS K-6758 at a tensile rate of 50 mm/min.

EXAMPLE 1

A 700 L reactor was purged with nitrogen, then 183 kg of 1,4-butanediol and 224 kg of succinic acid were charged in it. After the temperature was elevated under nitrogen stream, esterification by dehydration condensation was carried out for 3.5 hr at 192°–220° C., and after ceasing nitrogen charge, for further 3.5 hr under reduced pressures of 20-2 mmHg. A sample collected had an acid value of 9.2 mg/g, a number-average molecular weight (Mn) of 5,160 and a weight-average molecular weight (Mw) of 10,670. Subsequently, 34 g of tetraisopropoxy titanium, a catalyst, was added at normal pressures under nitrogen stream. The temperature was elevated to carry out a deglycol-reaction at temperatures of 215°–220° C. under reduced pressures of 15–0.2 mmHg for 5.5 hr. A sample collected had a number-average molecular weight (Mn) of 16,800 and a weight average molecular weight (Mw) of 43,600. The yield of resulting polyester prepolymer (A1) was 339 kg except condensate water.

5.42 kg of hexamethylene diisocyanate was added to the reactor containing 339 kg of the polyester prepolymer (A1) to perform a coupling reaction for 1 hr at 180°–200° C. The viscosity was rapidly increased, but no gelation occurred. Then, 1.70 kg of Irganox 1010 (Ciba-geigy) as an antioxidant and 1.70 kg of calcium stearate as a lubricant were added, and the mixture was further stirred for 30 min. The resulting reaction product was extruded into water, and cut by a cutter into pellets. The aliphatic polyester (B1) obtained after drying in a vacuum at 90° C. for 6 hr had a yield of 300 kg.

The obtained polyester (B1) was a slightly ivorylike white, waxy crystal, and had a melting point of 110° C., a number-average molecular weight (Mn) of 35,500 a weight-average molecular weight (Mw) of 170,000, a MFR (190° C.) of 1.0 g/10 min, a viscosity of 230 poises in a 10% orthochlorophenol solution and a melt viscosity of $1.5 \times 10^4$ poises at a temperature of 190° C. at a shear rate of 100 $\sec^{-1}$. The average-molecular weight was measured by a Shodex GPC System-11 (Showa Denko, gel permiation chromatography) using a HFIPA solution containing 5 mmol $CF_3COONa$ (concentration of 0.1% by weight) as a medium. A calibration curve was drawn using a PMMA standard sample (Shodex Standard M-75, Showa Denko).

A blow-molded bottle was prepared from the polyester (B1) under the following conditions.

A flattened bottle having an average 0.8 mm thickness and a 400 ml volume was molded with a molding machine having a screw diameter of 50 mm, L/D of 26 and CR of 3. Molding was performed at resin temperature of 160° C., 180° C. and 200° C., at a mold temperature of 20° C., a blow pressure of 5 kg/cm² and a cooling time of 15 seconds.

The moldability of the molded bottle at resin temperatures of 160° C., 180° C., and 200° C. were good with drawdown properties of 2.5 or more, and no melt fractures appeared on the bottle surface, showing better molding.

Further, even when the obtained bottle was filled 100% with water and repeatedly dropped ten times at an environmental temperature of 5° C. from a height of 2 m, it did not break so as to be sufficient enough for practical use.

When the molded bottle was subjected to the tensile test, its tensile strength at break was over 320 kg/cm² and elongation was over 300%.

Buried in the earth for 5 months, the molded vessel showed biodegradability to a degree that it would not hold water.

EXAMPLE 2

700 L reactor was purged with nitrogen, then 177 kg of 1,4-butanediol, 198 kg of succinic acid and 25 kg of adipic acid were charged in it. After the temperature was elevated under nitrogen stream, esterification by dehydration condensation was performed for 3.5 hr at 190°–210° C., and after ceasing nitrogen charge, for further 3.5 hr under reduced pressures of 20-2 mmHg. A sample collected had an acid value of 9.6 mg/g, a number-average molecular weight (Mn) of 6,100 and weight-average molecular weight (Mw) of 12,200. Subsequently, 20 g of tetraisopropoxy titanium, a catalyst, was added at normal pressures under nitrogen stream. The temperature was elevated to perform a deglycol-reaction at temperatures of 210°–220° C. under reduced pressures of 15–0.2 mmHg for 6.5 hr. A sample collected had a number-average molecular weight (Mn) of 17,300 and a weight-average molecular weight (Mw) of 46,400. The resulting polyester (A2) had a yield of 337 kg except condensate water.

4.66 kg of hexamethylene diisocyanate was added to the reactor containing 337 kg of polyester (A2) to perform a coupling reaction for 1 hr at 180°–200° C. The viscosity was rapidly increased, but no gelation occurred. Then, 1.70 kg of Irganox 1010 (Ciba-Geigy) as an antioxidant and 1.70 kg of calcium stearate as a lubricant were added, and the mixture was further stirred for 30 min. The resulting reaction product was extruded into water by an extruder, and cut by a cutter into pellets. The aliphatic polyester (B2) obtained after drying in a vacuum at 90° C. for 6 hr had a yield of 300 kg.

The obtained polyester (B2) was a slightly ivory-like white, waxy crystal, and had a melting point of 103° C., a number-average molecular weight (Mn) of 36,000, a weight-average molecular weight (Mw) of 200,900, a MFR (190° C.) of 0.52 g/10 min, a viscosity of 680 poises in a 10% orthochlorophenol solution and a melt viscosity of $2.2 \times 10^4$ poises at a temperature of 190° C. at a shear rate of 100 $\sec^{-1}$.

A blow-molded bottle was prepared from the polyester (B2) under the same conditions as in Example 1. The moldability of the molded bottle at resin temperatures of 160° C., 180° C. and 200° C. were good with drawdown properties of 2.5 or more, and no melt fractures appeared on the bottle surface, so that the results of repeated drop tests were good.

Buried in the earth for 5 months, the molded bottle showed the same results as in Example 1.

EXAMPLE 3

700 L reactor was purged with nitrogen then 145 kg of ethylene glycol, 251 kg of succinic acid and 4.1 kg of citric acid were charged in it. After the temperature was elevated under nitrogen stream, esterification by dehydration condensation was performed for 3.5 hr at 190°–210° C., and after ceasing nitrogen charge, for further 5.5 hr under reduced pressures of 20-2 mmHg. A sample collected had an acid value of 8.8 mg/g, a number-average molecular weight (Mn) of 6,800 and a weight-average molecular weight (Mw) of 13,500. Subsequently, 20 g of tetraisopropoxy titanium, a catalyst, was added at normal pressures under nitrogen stream. The temperature was elevated to perform a deglycol-reaction at temperatures of 210°–220° C. under reduced pressures of 15–0.2 mmHg for 4.5 hr. A sample collected had a number-average molecular weight (Mn) of 33,400 and a weight-average molecular weight (Mw) of 137,000. The resulting polyester (A3) had a yield of 323 kg except condensate water.

3.23 kg of hexamethylene diisocyanate was added to the reactor containing 323 kg of polyester (A3) to perform a coupling reaction for 1 hr at 180°–200° C. The viscosity was rapidly increased, but no gelation occurred. Then, 1.62 kg of Irganox 1010 (Ciba-Geigy) as an antioxidant and 1.62 kg of calcium stearate as a lubricant were added, and the mixture was further stirred for 30 min. The resulting reaction product was extruded into water by an extruder, and cut by a cutter into pellets. The polyester (B3) obtained after drying in a vacuum at 90° C. for 6 hr had a yield of 300 kg.

The obtained polyester (B3) was a slightly ivory-like white, waxy crystal, and had a melting point of 96° C., a number-average molecular weight (Mn) of 54,000, a weight-average molecular weight (Mw) of 324,000, a MFR (190° C.) of 1.1 g/10 min, a viscosity of 96 poises in a 10% orthochlorophenol solution and a melt viscosity of $1.6 \times 10^4$ poises at a temperature of 190° C. at a shear rate of 100 $\sec^{-1}$.

A blow-molded bottle was prepared from the polyester (B3) under the same conditions as in Example 1 except that molding was performed at resin temperatures of 170° C., 180° C. and 200° C.

The moldability of the molded bottle at resin temperatures of 170° C., 180° C. and 200° C. were good with drawdown properties of 2.5 or more, and no melt fractures appeared on the bottle surface, so that the results of repeated drop tests were good.

When the molded bottle was subjected to the tensile test, its strength was over 320 kg/cm$^2$ and elongation was over 300%, being good results.

Buried in the earth for 5 months, the molded bottle had degraded into a state where its shape had collapsed.

EXAMPLE 4

A 700 L reactor was purged with nitrogen, then 200 kg of 1,4-butanediol, 250 kg of succinic acid and 2.8 kg of trimethylol propane were charged in it. After the temperature was elevated under nitrogen stream, esterification by dehydration condensation was performed for 4.5 hr at 192°-220° C., and after ceasing nitrogen charge, for further 5.5 hr under reduced pressures of 20-2 mmHg. A sample collected had an acid value of 10.4 mg/g, a number-average molecular weight (Mn) of 4,900 and a weight-average molecular weight (Mw) of 10,000. Subsequently, 37 g of tetraisopropoxy titanium, a catalyst, was added at normal pressures under nitrogen stream. The temperature was elevated to perform a deglycol-reaction at temperatures of 210°-220° C. under reduced pressures of 15-1.0 mmHg for 8 hr. A sample collected had a number-average molecular weight (Mn) of 16,900 and a weight-average molecular weight (Mw) of 90,300 (Mw/Mn=5.4). The resulting polyester (A4) had a yield of 367 kg except condensate water of 76 kg.

3.67 kg of hexamethylene diisocyanate was added to the reactor containing 367 kg of polyester (A4) to perform a coupling reaction for 1 hr at 160°-200° C. The viscosity was rapidly increased, but no gelation occurred. Then, 367 g of Irganox 1010 (Ciba-Geigy) as an antioxidant and 367 g of calcium stearate as a lubricant were added, and the mixture was further stirred for 30 min. The resulting reaction product was extruded into water by an extruder, and cut by a cutter into pellets. The polyester (B4) obtained after drying in a vacuum at 90° C. for 6 hr had a yield of 350 kg.

The obtained polyester (B4) was a slightly ivorylike white, waxy crystal, and had a melting point of 110° C., a number-average molecular weight (Mn) of 17,900, a weight-average molecular weight (Mw) of 161,500 (Mw/Mn=9.0), a MFR (190° C.) of 0.21 g/10 rain and a melt viscosity of 2.0×10$^4$ poises at a temperature of 190° C. at a shear rate of 100 sec$^{-1}$. The average molecular weight was measured in the same manner as in Example 1.

A blow-molded bottle was prepared from the polyester (B4) according to the same process as in Example 1.

The moldability of the molded bottle at resin temperatures of 160° C., 180° C. and 200° C. were good with drawdown properties of 3.5 or more, and no melt fractures appeared on the bottle surface, showing better molding.

Further, even when the obtained vessel was filled 100% with water and repeatedly dropped in an environmental temperature of 5° C. ten times from a height of 2 m, it did not break so as to be sufficient enough for practical use.

When the molded vessel was subjected to the tensile test, its fracture strength was over 430 kg/cm$^2$ and elongation was over 360%.

Buried in the earth for 5 months, the molded vessel showed biodegradability to a degree that it would not hold water.

COMPARATIVE EXAMPLE 1

Although polyester (A1) in Example 1 was molded under the conditions of resin temperature of 140° C. and 160° C., blow molded vessels could not be obtained because they have the drawdown property of 2.0 or less.

What is claimed is:

1. Blow-molded articles comprising an aliphatic polyester having a melt viscosity of $3.0 \times 10^3$-$2.0 \times 10^5$ poises at a temperature of 190° C. and a shear rate of 100 sec$^{-1}$, and having a melting point of 70°-190° C., wherein said aliphatic polyester is obtained by adding from 0.1 to 5 parts by weight of diisocyanate to 100 parts by weight of a prepolymer in a molten state, wherein said prepolymer
    is obtained from a reaction of at least an aliphatic glycol and an aliphatic dicarboxylic acid, wherein the reaction includes (a) succinic acid, or its derivatives, reacted with 1,4-butanediol, (b) succinic acid, adipic acid, or their derivatives, reacted with 1,4-butanediol, or (c) succinic acid, or its derivatives, reacted with ethylene glycol, and
    has a number-average molecular weight of at least 10,000.

2. The blow-molded articles as claimed in claim 1 wherein the aliphatic polyester has a number-average molecular weight of at least 10,000 and contains 0.03-3.0% by weight of urethane bonds.

3. The blow-molded articles as claimed in claim 1 or 2 consisting of an aliphatic polyester obtained by reacting 0.1-5 parts by weight of diisocyanate with 100 parts by weight of an aliphatic polyester prepolymer having a number-average molecular weight of at least 10,000 and a melting point of at least 60° C.

4. The blow-molded articles as claimed in any one of claims 1 to 2 wherein tensile strength at break is 320 kg/cm$^2$ or more, elongation at break is 300% or more, stiffness is 3,000 kg/cm$^2$ or more, and notched Izod impact strength determined with a pressed test piece at 23° C. is 1.0 kg·cm/cm$^2$ or more.

5. The blow-molded articles as claimed in claim 1 or 2 wherein the aliphatic polyester has a repeated chain structure in which a polyester prepolymer, which has a number-average molecular weight (Mn) of 10,000 or more and consists of an aliphatic glycol and aliphatic dicarboxylic acid, is combined through urethane bonds.

6. The blow-molded articles as claimed in claim 1 or 2 wherein the aliphatic polyester has a repeated chain structure in which a polyester prepolymer having a number-average molecular weight (Mn) of 10,000 or more and obtained by reacting the aliphatic glycol, the aliphatic dicarboxylic acid and, as a third component, at least one polyfunctional component selected from the group consisting of trifunctional or tetrafunctional polyols, oxycarboxylic acids and polybasic carboxylic acids or acid anhydrides thereof, is combined through a urethane bond.

7. The blow-molded articles as claimed in claim 5 or 6 wherein the polyester prepolymer has a unit selected from the group consisting of succinic acid, adipic acid, succinic anhydride and adipic anhydride as a dicarboxylic acid unit.

8. The blow-molded articles as claimed in claim 6 wherein the polyester prepolymer contains one or more compounds selected from the group consisting of trimethylol propane, glycerin and pentaerythritol as the trifunctional or tetrafunctional polyol of the third component.

9. The blow-molded articles as claimed in claim 6 wherein the polyester prepolymer contains one or more compounds selected from the group consisting of malic acid, citric acid and tartaric acid as the trifunctional or tetrafunctional oxycarboxylic acid of the third component.

10. The blow-molded articles as claimed in claim 6 wherein the polyester prepolymer contains one or more compounds selected from the group consisting of trimesic acid, propane tricarboxylic acid, trimellitic anhydride, pyromellitic anhydride, benzophenone tetracarboxylic anhydride and cyclopentane tetracarboxylic anhydride as the trifunctional or tetrafunctional polybasic carboxylic acid of the third component.

11. The blow-molded articles as claimed in claim 3 wherein tensile strength at break is 320 kg/cm$^2$ or more, elongation at break is 300% or more, stiffness is 3,000 kg/cm$^2$ or more, and notched Izod impact strength determined with a pressed test piece at 23° C. is 1.0 kg·cm/cm$^2$ or more.

* * * * *